(12) United States Patent
Cox et al.

(10) Patent No.: US 9,052,468 B2
(45) Date of Patent: Jun. 9, 2015

(54) FIBER OPTIC ADAPTER MOUNT (75) Inventors: Terry Dean Cox, Keller, TX (US);
Grzegorz Fabrykowski, Strykow (PL);
Jürgen Matthies, Wetter (DE); Diana Rodriguez, Fort Worth, TX (US)

(73) Assignee: Corning Cable Systems LLC, Hickory, NC (US)

( * ) Notice: Subject to any disclaimer, the term of this patent is extended or adjusted under 35 U.S.C. 154(b) by 121 days.

(21) Appl. No.: 13/302,067

(22) Filed: Nov. 22, 2011

(65) Prior Publication Data

US 2012/0224823 A1 Sep. 6, 2012

Related U.S. Application Data

(60) Provisional application No. 61/449,378, filed on Mar. 4, 2011.

(51) Int. Cl.
*G02B 6/00* (2006.01)
*G02B 6/38* (2006.01)
*G02B 6/44* (2006.01)

(52) U.S. Cl.
CPC ............ *G02B 6/3825* (2013.01); *G02B 6/3897* (2013.01); *G02B 6/4471* (2013.01); *G02B 6/00* (2013.01)

(58) Field of Classification Search
USPC ........................................................ 385/136
See application file for complete search history.

(56) References Cited

U.S. PATENT DOCUMENTS

| 3,830,957 | A | 8/1974 | Oberdiear |
| 4,568,145 | A | 2/1986 | Colin et al. |
| 4,795,229 | A | 1/1989 | Abendschein et al. |
| 5,012,042 | A | 4/1991 | Summach |
| 5,048,914 | A | 9/1991 | Sneddon |
| 5,064,268 | A | 11/1991 | Morency et al. |
| 5,067,783 | A | 11/1991 | Lampert |
| 5,082,454 | A | 1/1992 | Tonkiss et al. |
| 5,140,659 | A | 8/1992 | Minds et al. |
| 5,210,810 | A | 5/1993 | Darden et al. |
| 5,237,129 | A | 8/1993 | Obara |
| 5,461,688 | A | 10/1995 | Lee |
| 5,473,715 | A | 12/1995 | Schofield et al. |
| 5,542,015 | A | 7/1996 | Hultermans |
| 5,566,268 | A | 10/1996 | Radliff et al. |
| 5,715,348 | A * | 2/1998 | Falkenberg et al. .......... 385/135 |

(Continued)

FOREIGN PATENT DOCUMENTS

| CH | 689434 A5 | 4/1999 |
| EP | 1199587 A1 | 4/2002 |

(Continued)

OTHER PUBLICATIONS

International Search Report and Written Opinion for PCT/US2011/027813 mailed Jun. 24, 2011, 14 pages.

(Continued)

*Primary Examiner* — Omar Rojas (74) *Attorney, Agent, or Firm* — Brad Christopher Rametta (57) ABSTRACT

A fiber optic adapter mount is disclosed. The fiber optic adapter mount has a receiving area for receiving an adapter, a retention feature and a mounting feature. The retention feature is configured to releasably retain the adapter in the receiving area. The mounting feature is for mounting the adapter mount to a surface.

16 Claims, 7 Drawing Sheets

(56) References Cited

U.S. PATENT DOCUMENTS

| | | | |
|---|---|---|---|
| 5,722,842 | A | 3/1998 | Cairns |
| 5,754,724 | A | 5/1998 | Peterson et al. |
| 5,881,191 | A * | 3/1999 | Liberty ........................... 385/58 |
| 5,949,946 | A * | 9/1999 | Debortoli et al. ............. 385/134 |
| 6,021,246 | A | 2/2000 | Koshiyama et al. |
| 6,085,004 | A | 7/2000 | Dower et al. |
| 6,264,374 | B1 | 7/2001 | Selfridge et al. |
| 6,364,539 | B1 * | 4/2002 | Shahid ........................... 385/83 |
| 6,483,980 | B1 | 11/2002 | Wu et al. |
| 6,533,465 | B1 | 3/2003 | Lesesky et al. |
| 6,736,545 | B2 | 5/2004 | Cairns et al. |
| 6,931,193 | B2 * | 8/2005 | Barnes et al. ................ 385/134 |
| 6,974,262 | B1 | 12/2005 | Rickenbach |
| 7,074,066 | B2 | 7/2006 | Pepe |
| 7,097,486 | B2 | 8/2006 | Parsons |
| 7,118,284 | B2 * | 10/2006 | Nakajima et al. ............... 385/53 |
| 7,304,241 | B2 | 12/2007 | Trieb et al. |
| 7,738,759 | B2 | 6/2010 | Parikh et al. |
| 7,744,286 | B2 | 6/2010 | Lu et al. |
| 7,764,858 | B2 * | 7/2010 | Bayazit et al. ................ 385/135 |
| 7,938,686 | B2 | 5/2011 | Khemakhem et al. |
| 7,942,587 | B2 | 5/2011 | Barnes et al. |
| 8,107,785 | B2 * | 1/2012 | Berglund et al. ............. 385/135 |
| 8,164,044 | B2 | 4/2012 | Mossman |
| 8,272,787 | B2 * | 9/2012 | Lu et al. .......................... 385/56 |
| 8,480,312 | B2 | 7/2013 | Smith et al. |
| 2002/0159745 | A1 | 10/2002 | Howell et al. |
| 2003/0010519 | A1 | 1/2003 | Pieck |
| 2003/0156798 | A1 | 8/2003 | Cull |
| 2005/0082467 | A1 | 4/2005 | Mossman |
| 2006/0133759 | A1 | 6/2006 | Mullaney et al. |
| 2006/0171639 | A1 | 8/2006 | Dye |
| 2007/0014522 | A1 | 1/2007 | Yamaguchi et al. |
| 2007/0263964 | A1 | 11/2007 | Cody et al. |
| 2008/0050070 | A1 | 2/2008 | Gurreri et al. |
| 2008/0175543 | A1 | 7/2008 | Durrant et al. |
| 2009/0148104 | A1 | 6/2009 | Lu et al. |
| 2009/0162016 | A1 | 6/2009 | Lu et al. |
| 2009/0245743 | A1 * | 10/2009 | Cote et al. .................... 385/135 |
| 2010/0027955 | A1 | 2/2010 | Parikh et al. |
| 2010/0040331 | A1 | 2/2010 | Khemakhem et al. |
| 2010/0079759 | A1 | 4/2010 | Mossman |
| 2010/0129039 | A1 * | 5/2010 | Smrha et al. .................. 385/134 |
| 2010/0303431 | A1 | 12/2010 | Cox et al. |
| 2010/0329624 | A1 | 12/2010 | Zhou et al. |
| 2011/0123157 | A1 | 5/2011 | Belsan et al. |
| 2011/0188810 | A1 | 8/2011 | Ciechomski et al. |
| 2011/0200286 | A1 | 8/2011 | Smith et al. |
| 2011/0211326 | A1 | 9/2011 | Drouard et al. |
| 2011/0229083 | A1 | 9/2011 | Dainese Junior et al. |
| 2012/0039571 | A1 | 2/2012 | Ciechomski et al. |

FOREIGN PATENT DOCUMENTS

| | | |
|---|---|---|
| FR | 2546308 A1 | 11/1984 |
| JP | 0772338 A | 3/1995 |
| WO | 2005078493 A1 | 8/2005 |
| WO | 2006044080 A1 | 4/2006 |
| WO | 2006060250 A2 | 6/2006 |
| WO | 2006123214 A1 | 11/2006 |
| WO | 2008139218 A1 | 11/2008 |

OTHER PUBLICATIONS

Final Office Action for U.S. Appl. No. 13/014,229 mailed May 22, 2014, 13 pages.
Advisory Action for U.S. Appl. No. 13/014,229 mailed Jul. 10, 2014, 4 pages.
Non-final Office Action for U.S. Appl. No. 13/014,229 mailed Sep. 23, 2013, 12 pages.
Applicant-Initiated Interview Summary for U.S. Appl. No. 13/014,229 mailed Jan. 31, 2014, 3 pages.
Non-final Office Action for U.S. Appl. No. 13/603,928 mailed Apr. 18, 2013, 11 pages.
Notice of Allowance for U.S. Appl. No. 13/603,928 mailed Sep. 23, 2013, 7 pages.
Notice of Allowance for U.S. Appl. No. 13/603,928 mailed Jan. 15, 2014, 7 pages.
Notice of Allowance for U.S. Appl. No. 13/603,928 mailed Apr. 21, 2014, 7 pages.
Non-final Office Action for U.S. Appl. No. 13/741,529 mailed Jan. 27, 2014, 11 pages.
Notice of Allowance for U.S. Appl. No. 13/741,529 mailed May 14, 2014, 8 pages.
International Search Report for PCT/US2012/027367 mailed Sep. 11, 2012, 6 pages.
International Preliminary Report on Patentability for PCT/US2012/027367 mailed Sep. 19, 2013, 10 pages.
Non-Final Office Action for U.S. Appl. No. 13/014,229 mailed Dec. 5, 2014, 12 pages.
Non-Final Office Action for U.S. Appl. No. 13/552,900 mailed Dec. 5, 2014, 29 pages.
Notice of Allowance for U.S. Appl. No. 14/061,294 mailed Dec. 17, 2014, 7 pages.

* cited by examiner

FIBER OPTIC ADAPTER MOUNT

RELATED APPLICATIONS

This application claims the benefit of priority under 35 U.S.C. §119 of U.S. Provisional Application Ser. No. 61/449,378 filed on Mar. 4, 2011 the content of which is relied upon and incorporated herein by reference in its entirety.

BACKGROUND

1. Field of the Disclosure

The technology of the disclosure relates to mounts for single fiber and multiple fiber adapters to allow for the interconnection of connectorized fiber optic cables without requiring a fiber distribution terminal, and which may be positioned on a wall, in a channel, in a ceiling or beneath molding to facilitate routing of fiber optic cables to subscriber premises particularly in multiple dwelling units.

2. Technical Background

In the world of the ever-increasing need for broadband bandwidth optical cables have become the main part of telecommunication networks. Optical cables can transmit voice signals, data signals and video signals for very long distances with very high speed. Developments of optic telecommunication networks allow the connection of the end user directly to the optical fiber. This kind of network technology known as FTTH technology (fiber to the home) requires extending an "all optical" communication network closer to the subscribers. As a result such telecommunication networks include large number distribution points from a distribution cable to an end user or subscriber.

One of the key parts of the FTTH network is the last mile connection which often is an indoor installation. Different kind of buildings like multiple dwelling units and blocks of apartments require complicated cabling systems which might mean that there are many separated cables, each one to connect one subscriber premises. Installation of many cables which provide the connection between a main distribution point (which usually is located in the basement or in another place of the building) and the end user may cause many problems with routing through the wall or levels of the building. As a result, such installations consume a lot of time and costs.

SUMMARY OF THE DETAILED DESCRIPTION

Embodiments disclosed in the detailed description include a fiber optic adapter mount having a receiving area for receiving an adapter, a retention feature and a mounting feature. The retention feature is configured to releasably retain the adapter in the receiving area. The mounting feature is for mounting the adapter mount to a surface. One or more resilient walls which may flex to allow the adapter to be received in and/or removed from the receiving area. The retention feature may have at least one tab, which may extend from one of the one or more resilient walls.

The receiving area may be located in the enclosure. The enclosure may have a base and a cover and the cover may be attached to the base. The cover may be hingedly attached to the base allowing the cover to mate with the base and provide an open position and a closed position, and/or a partially open position. Access may be provided to an interior of the enclosure when the cover is in the open position. The enclosure may have a connecting feature allowing the fiber optic adapter to be connected to another fiber optic adapter. The connecting feature may include a protrusion and/or a groove. The protrusion and groove may be complementary such that the protrusion of the fiber optic adapter inserts into the groove of another fiber optic adapter to releasably connect the fiber optic adapter to the another fiber optic adapter.

Other embodiments in the detailed description include a fiber optic adapter mount having an enclosure with an interior, a receiving area, a retention feature and a mounting feature. The receiving area is in the interior of the enclosure is receiving an adapter. The receiving area may have resilient walls. The retention feature may extend from the resilient walls and be configured to releasably retain the adapter in the receiving area. The mounting feature may be for mounting the adapter mount to a surface. The enclosure may include a base and a cover, and the cover may be hingedly movable with the base from an open position to a closed position. An actuator may extend from one of the resilient walls. Pressure applied to the actuator may force the resilient wall away from another resilient wall allowing the adapter to be removed from the receiving area. One or more tie down lance may be formed in the base and configured to receive a restraining device for restraining fiber optic cable.

Other embodiments in the detailed description include an array if fiber optic adapter mounts including a plurality of fiber optic adapters mounts. Each fiber optic adapter mount in the array may include an enclosure, a receiving area, and a connecting feature. The enclosure may have an interior, a first section and a second section. The receiving area may be for receiving a fiber optic adapter in the interior. The connecting feature may allow the fiber optic adapter mounts to be releasably connected to each other. The first section or the second section of the enclosure of at least one of the fiber optic adapters may be removable to allow access to an interior of the enclosure of the fiber optic adapter without disconnecting the fiber optic adapter from the array.

DESCRIPTION OF THE DISCLOSURE

Embodiments disclosed in the detailed description include a mount for a fiber optic adapter. The adapter may be a single fiber adapter or a multiple fiber adapter. Additionally, the mount may be integral to and formed as part of the adapter body, or, alternatively, may be a separate component to, on or in which the adapter may be removably fastened. Further, the mount may include an enclosure providing environmental protection for the adapter and connectors of the fiber optic cable connected thereto. The adapter may be configured to receive one or more fiber optic connectors attached to the ends of fiber optic cables to interconnect the optical fibers of the fiber optic cables.

The fiber optic adapter may be one that provides for multi-fiber connector to multi-fiber connector interconnection, such as, for example, an MTP connector, or OptiTIP connector, as commercially available from Corning Cable Systems LLC of Hickory, N.C., or other types of multi-fiber adapters. Additionally or alternatively, the fiber optic adapter may be one that provides for single fiber connector to single fiber connector interconnection, for example an SC connector, LC connector, or OptiTAP connector, as commercially available from Corning Cable Systems LLC of Hickory, N.C., or other types of single fiber adapters.

Embodiments disclosed in the detailed description include a fiber optic adapter mount having a receiving area for receiving an adapter, a retention feature and a mounting feature. The retention feature is configured to releasably retain the adapter in the receiving area. The mounting feature is for mounting the adapter mount to a surface. One or more resilient walls which may flex to allow the adapter to be received in and/or removed from the receiving area. The retention feature may have at least one tab, which may extend from one of the one or more resilient walls.

The receiving area may be located in the enclosure. The enclosure may have a base and a cover and the cover may be attached to the base. The cover may be hingedly attached to the base allowing the cover to mate with the base and provide an open position and a closed position, and/or a partially open position. Access may be provided to an interior of the enclosure when the cover is in the open position. The enclosure may have a connecting feature allowing the fiber optic adapter to be connected to another fiber optic adapter. The connecting feature may include a protrusion and/or a groove. The protrusion and groove may be complementary such that the protrusion of the fiber optic adapter inserts into the groove of another fiber optic adapter to releasably connect the fiber optic adapter to the another fiber optic adapter.

Other embodiments in the detailed description include a fiber optic adapter mount having an enclosure with an interior, a receiving area, a retention feature and a mounting feature. The receiving area is in the interior of the enclosure is receiving an adapter. The receiving area may have resilient walls. The retention feature may extend from the resilient walls and be configured to releasably retain the adapter in the receiving area. The mounting feature may be for mounting the adapter mount to a surface. The enclosure may include a base and a cover, and the cover may be hingedly movable with the base from an open position to a closed position. An actuator may extend from one of the resilient walls. Pressure applied to the actuator may force the resilient wall away from another resilient wall allowing the adapter to be removed from the receiving area. One or more tie down lance may be formed in the base and configured to receive a restraining device for restraining fiber optic cable.

Other embodiments in the detailed description include an array if fiber optic adapter mounts including a plurality of fiber optic adapters mounts. Each fiber optic adapter mount in the array may include an enclosure, a receiving area, and a connecting feature. The enclosure may have an interior, a first section and a second section. The receiving area may be for receiving a fiber optic adapter in the interior. The connecting feature may allow the fiber optic adapter mounts to be releasably connected to each other. The first section or the second section of the enclosure of at least one of the fiber optic adapters may be removable to allow access to an interior of the enclosure of the fiber optic adapter without disconnecting the fiber optic adapter from the array.

Figure 1:
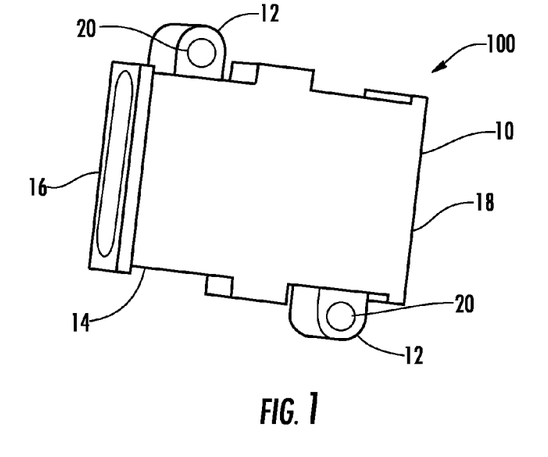
FIG. 1 is a schematic diagram of a perspective view of an exemplary fiber optic adapter with mounting flanges incorporated into and formed as a part of the adapter body.

In this regard, FIGS. 1-6 illustrate exemplary embodiments of fiber optic adapter mount 100, 200, 300 and 400. FIG. 1 is a schematic diagram of a perspective elevation view of the exemplary adapter mount 100. Adapter mount 100 is integral with the adapter 10 with a mounting feature 12, which may be in the form of mounting flanges incorporated into and formed as a part of the adapter body 14. The adapter has a first end 16 and an opposing second end 18 for receiving fiber optic connectors attached to the ends of fiber optic cables (not shown in FIG. 1) to interconnect the fiber optic cables. Two mounting flanges 12 with mounting apertures 20 are shown in FIG. 1, but it should be understood that any number of mounting flanges 12 may be included. A screw, rivet, push-pin, plunger, or any other type or form of fastener may be inserted through the mounting apertures 20 on the mounting feature 12 to attach the adapter 10 to a mounting surface, as non-limiting examples, on a wall, in a channel, in a ceiling or beneath molding.

Figure 2:
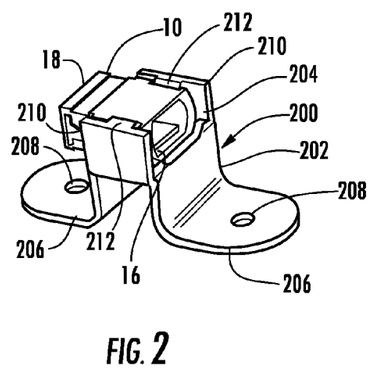
FIG. 2 is a schematic diagram of a perspective view of an exemplary adapter mount in the form of a mounting clip with a fiber optic adapter removably fastened thereto.

FIG. 2 is a schematic diagram of a front, perspective elevation view of an exemplary adapter mount 200. In FIG. 2, the adapter mount 200 is the form of a mounting clip 202 with a receiving area 204 and a mounting feature 206. The mounting feature 206, which may be in the form of mounting flanges which may have mounting apertures 208. The receiving area 204 may be at least partially defined by resilient walls 210, each of such resilient walls 210 having a releasable retention feature 212 in the form of a tab 212. Although FIG. 2 illustrates the retention feature 212 as a tab, any suitable type of releasable retention feature may be used. When an adapter 10 is inserted into the receiving area 204 of the adapter mount 200, the pressure of the adapter 10 on the retention tabs 212 forces the retention tabs 212 and, thereby, the resilient walls 210 to spread apart. When the retention tabs 212 and the resilient walls 210 spread apart a sufficient width, the adapter 10 is allowed to seat within the receiving area 204. The resiliency of the resilient walls 210 forces the resilient walls 210 back toward each other and the retention tabs 212 position over the adapter 10 removably retaining the adapter 10 in the receiving area 204 of the adapter mount 200. To remove the adapter 10, the adapter 10 is forced up against the retention tabs 212. When the pressure from the adapter 10 is sufficient enough to force the resilient walls 210 apart, the retention tabs 212 separate enough to not be over the adapter 10, the adapter may be lifted from the receiving area 204 and removed from the adapter mount 200. A screw, rivet, push-pin, plunger, or any other type or form of fastener may be inserted through the mounting apertures 208 on the mounting feature 206 to attach the adapter 10 to a mounting surface, as non-limiting examples, on a wall, in a channel, in a ceiling or beneath molding.

Figure 3:
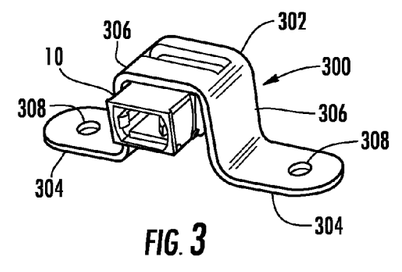
FIG. 3 is a schematic diagram of a perspective view of an exemplary adapter mount in the form of a mounting clip and separate snap-on cover with a fiber optic adapter removably fastened thereto.

FIG. 3. is a schematic diagram of a front, perspective elevation view of an exemplary adapter mount 300. The adapter mount 300 has a snap-on cover 302 with mounting feature 304, which may be in the form of mounting flanges, or the like, with mounting apertures 308. The snap-on cover 302 has resilient walls 306 which spread apart when the cover 302 is placed over the adapter 10, or alternatively, when the adapter 10 is inserted into the cover 10. Once the cover 302 is over the adapter 10, the resiliency of the resilient walls 306 applies pressure against the adapter 10 and, thereby, provides for the adapter 10 to friction-fit or pressure-fit into the cover 302. In this manner, the adapter 20 is removably retained by the cover 302. Alternatively or additionally, the adapter mount 300 may have one or more retention tabs similar to the retention tabs 212 described with respect to FIG. 2, and the adapter 10 may be removably retained in the adapter mount 300 by the retention tabs 212. A screw, rivet, push-pin, plunger, or any other type or form of fastener may be inserted through the mounting apertures 308 on the mounting feature 304 to attach the adapter mount 300 to a mounting surface, as non-limiting examples, on a wall, in a channel, in a ceiling or beneath molding.

Figure 4:
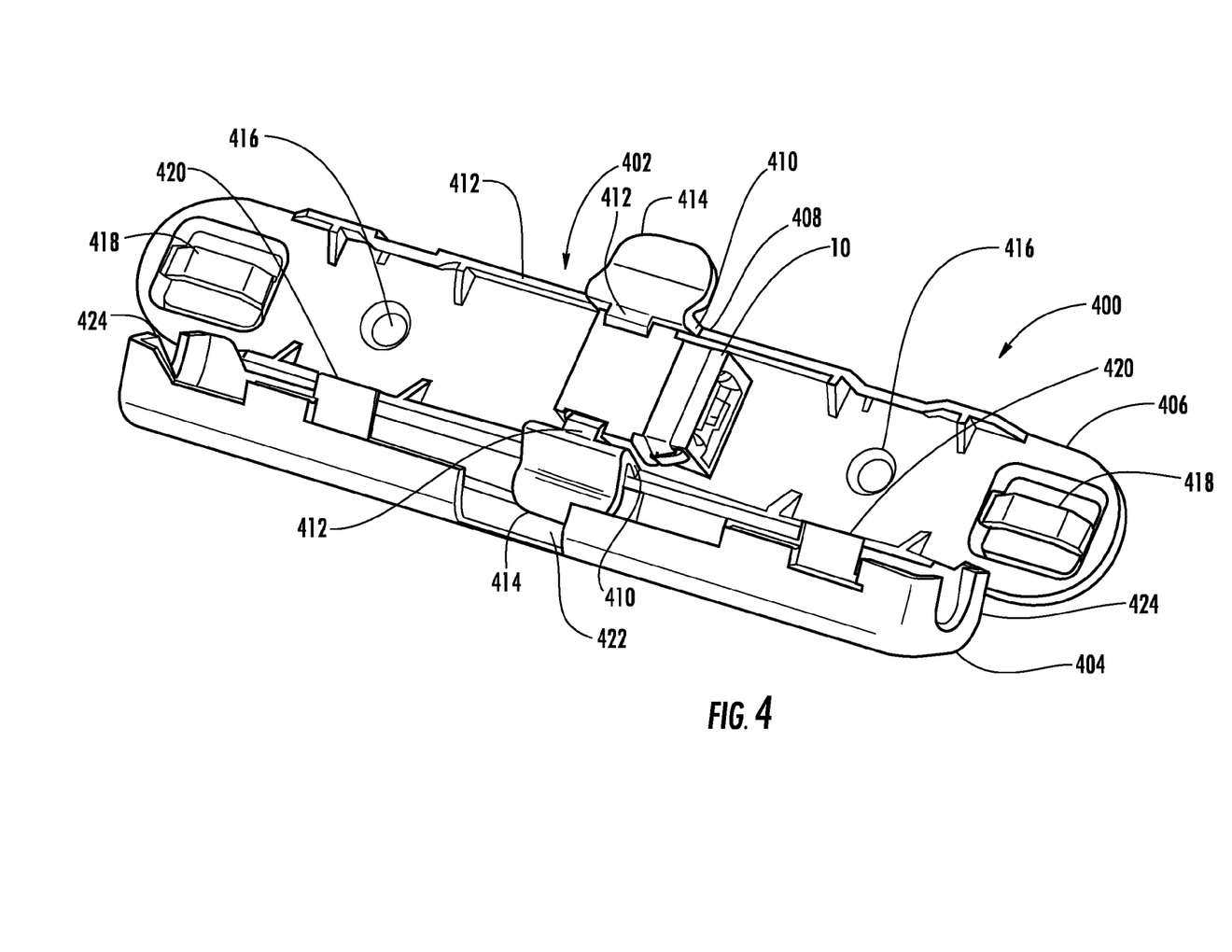
FIG. 4 is a schematic diagram of a perspective view of an exemplary adapter mount having a mounting clip assembly and a integrated living hinge cover, with the cover in an open position with a fiber optic adapter removably fastened to the mounting clip assembly.
Figure 5:
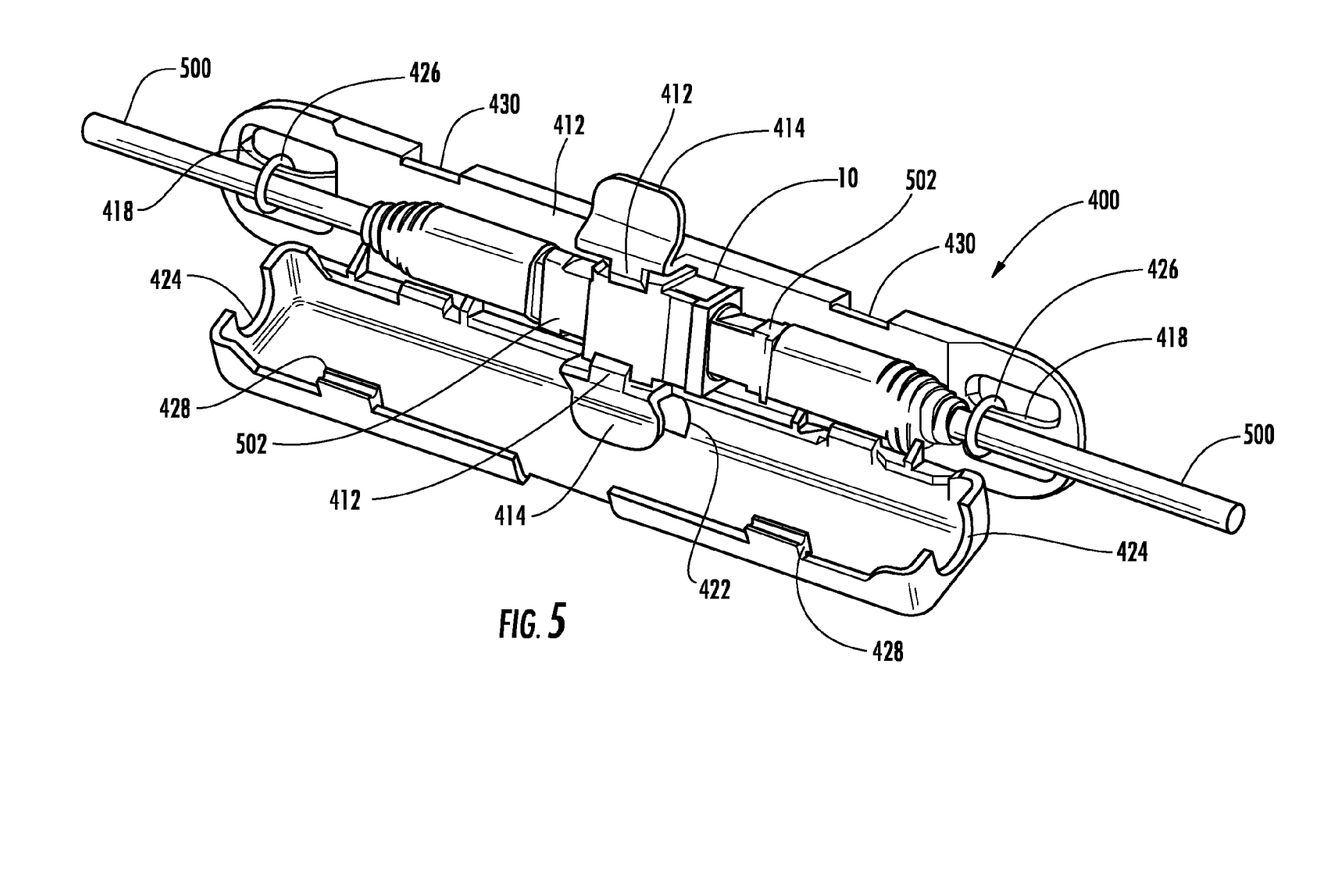
FIG. 5 is a schematic diagram of a perspective view of adapter mount of FIG. 4 with two fiber optic cables, each connectorized with fiber optic connectors and with the fiber optic connectors inserted into each end of the adapter to interconnect the fiber optic connectors.
Figure 6:
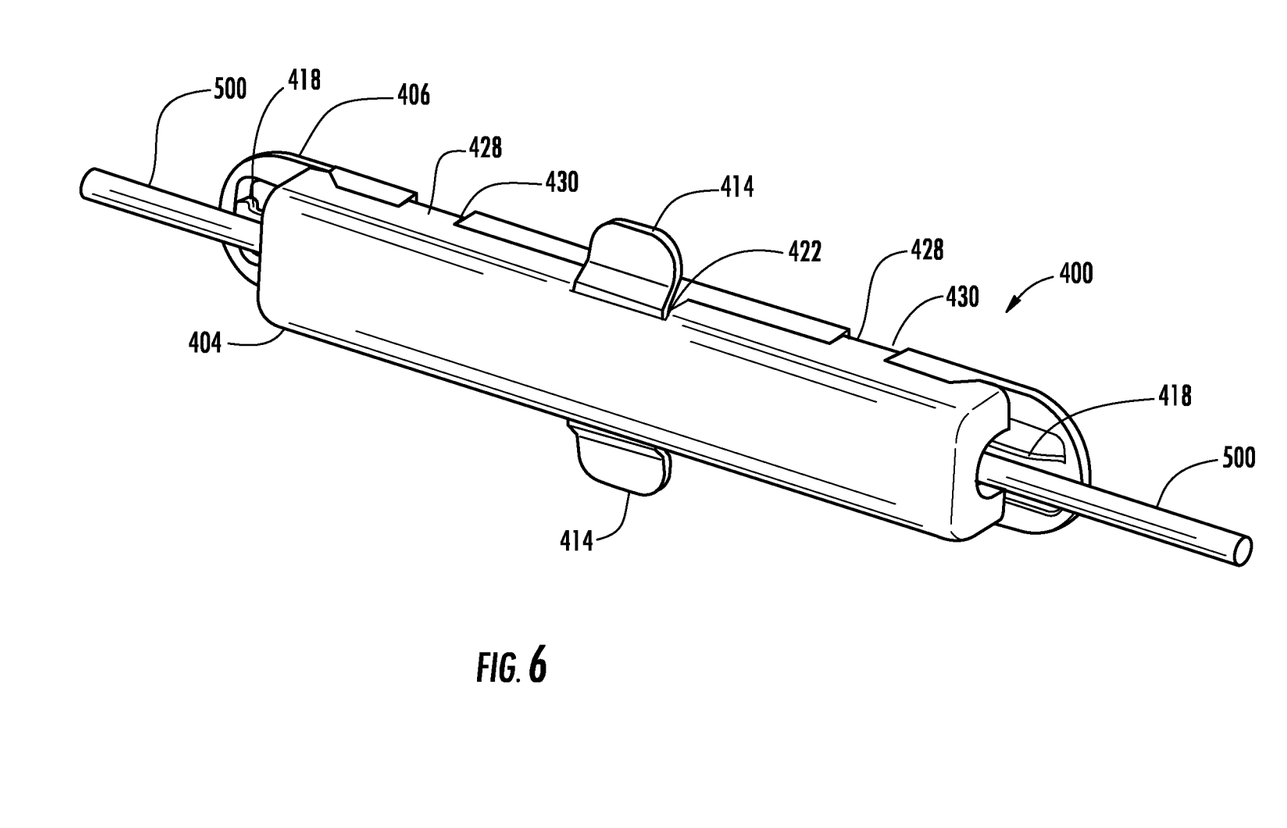
FIG. 6 is a schematic diagram of a perspective view of adapter mount of FIG. 4 with the cover in a closed position and the fiber optic cables extending from opposite ends of the adapter mount.

FIGS. 4-6 illustrate and exemplary embodiment of a adapter mount 400 having an enclosure 402 and an integrated living hinge cover 404. In this regard a living hinge 420 may connect the cover 404 to a base 406. Instead of a living hinge 420 some other type of hinge or fastener may be used. The cover 404 may be in an open position, a closed position or intermediate or transitioning between an open or a closed position being in a partially open position. When the cover 404 is in an open position or a partially open position access may be provided to an interior 403 of the enclosure 402. FIG. 4 illustrates the adapter mount 400 with the cover 404 in an open position with the fiber optic adapter 10 removably retained in the enclosure 402. The enclosure 402 has a receiving area 408 on the base 406. The receiving area 408 may be at least partially defined by resilient walls 410, each of such resilient walls 410 having one or more retention tabs 412. When an adapter 10 is inserted into the receiving area 408, the pressure of the adapter 10 on the retention tabs 412 forces the retention tabs 412 and, thereby, the resilient walls 410 to spread apart. When the retention tabs 412 and the resilient walls 410 spread apart a sufficient width, the adapter 10 is allowed to seat within the receiving area 408. The resiliency of the resilient walls 410 forces the resilient walls 410 back toward each other and the retention tabs 412 position over the adapter 10 removably retaining the adapter 10 in the receiving area 408. To remove the adapter 10, the adapter is forced up against the retention tabs 412. When the pressure from the adapter 10 is sufficient enough to force the resilient walls 410 apart, the retention tabs 412 separate enough to not be over the adapter 10, the adapter 10 may be lifted from the receiving area 408 and removed from the adapter mount 400. Alternatively or additionally, one or more actuators 414 may extend from the resilient walls 410. In this regard, pressure may be manually applied to the actuators 414 which acts to force apart the resilient walls 410 and, thereby, the retention tabs 412. In this manner, the actuators 414 may be used to insert and/or remove the adapter 10 from the receiving area 408. The base 406 may have a mounting feature 416, which may be in the form of mounting apertures. A screw, rivet, push-pin, plunger, or any other type or form of fastener may be inserted through the mounting apertures 416 to attach the adapter mount 400 to a mounting surface, as non-limiting examples, on a wall, in a channel, in a ceiling or beneath molding.

Continuing with reference to FIG. 4 and, also, now to FIG. 5, the adapter mount 400 is illustrated with two fiber optic cables 500 having connectors 502 installed in the adapter mount 400 with the connectors 502 received by the adapter 10 at each end thereof. The base 406 has one or more tie down lances 418 formed therein and configured to receive a restraining device for the fiber optic cable. Restraining devices such as tie wraps 426 or other types of restraining device may inserted around the tie down lances 418 may be used to restrain fiber optic cable 500 to the base 406 and to provide strain relief for the cables 500. The cover 404 pivots on one or more the living hinges 420 to close on the base 406 (see FIG. 6). The cover 404 has actuator cutouts 422 aligned with the actuators 414 such that when the cover 404 is closed onto the base 406 the actuators 414 fit through the actuator cutouts 422. Additionally, the cover 404 has a cable cutout 424 at each end that aligns with the fiber optic cables 500 extending from the adapter mount 400 and, thereby, allows for the ingress and egress of the cables when the cover 404 is closed on the base 406. One or more fastening tabs 428 on the cover 404 mate with slots 430 on the base 406 when the cover 404 is closed.

FIG. 6 illustrates the adapter mount 400 with the cover 404 in the closed position and with the fiber optic cables 500 extending from opposite ends of the adapter mount 400 through the cable cutouts 424. The cover 404 is joined to the base 406 with the fastening tabs 428 inserted into the respective slots 430 to releasably retain the cover 404 in the closed position. The actuators 414 are shown extending through the actuator cutouts 422. The fastening tabs 428 are sufficiently resilient such that when pressure is applied to the cover 404 the fastening tabs 428 to release from the slots 430 allowing the cover 404 to pivot on the living hinges 420 and move to the open position.

Figure 7:
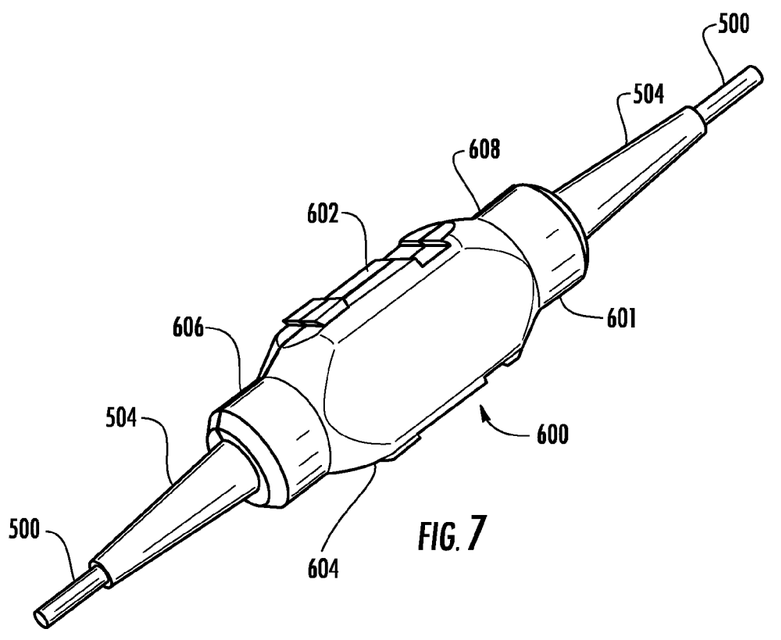
FIG. 7 is a schematic diagram of a perspective view of an exemplary fiber optic adapter mount with complementary grooves and protrusions.
Figure 8:
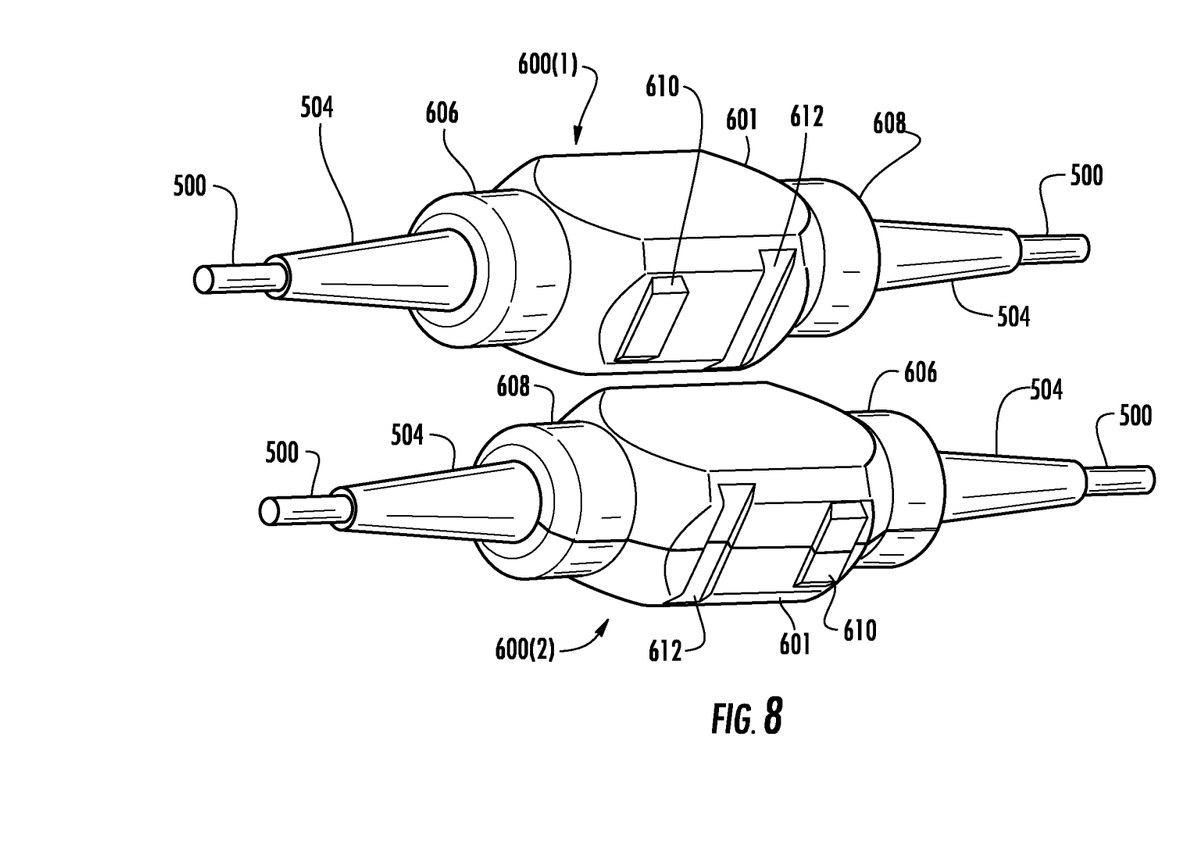
FIG. 8 is a schematic diagram of perspective views of two fiber optic adapter mounts of FIG. 7.
Figure 9:
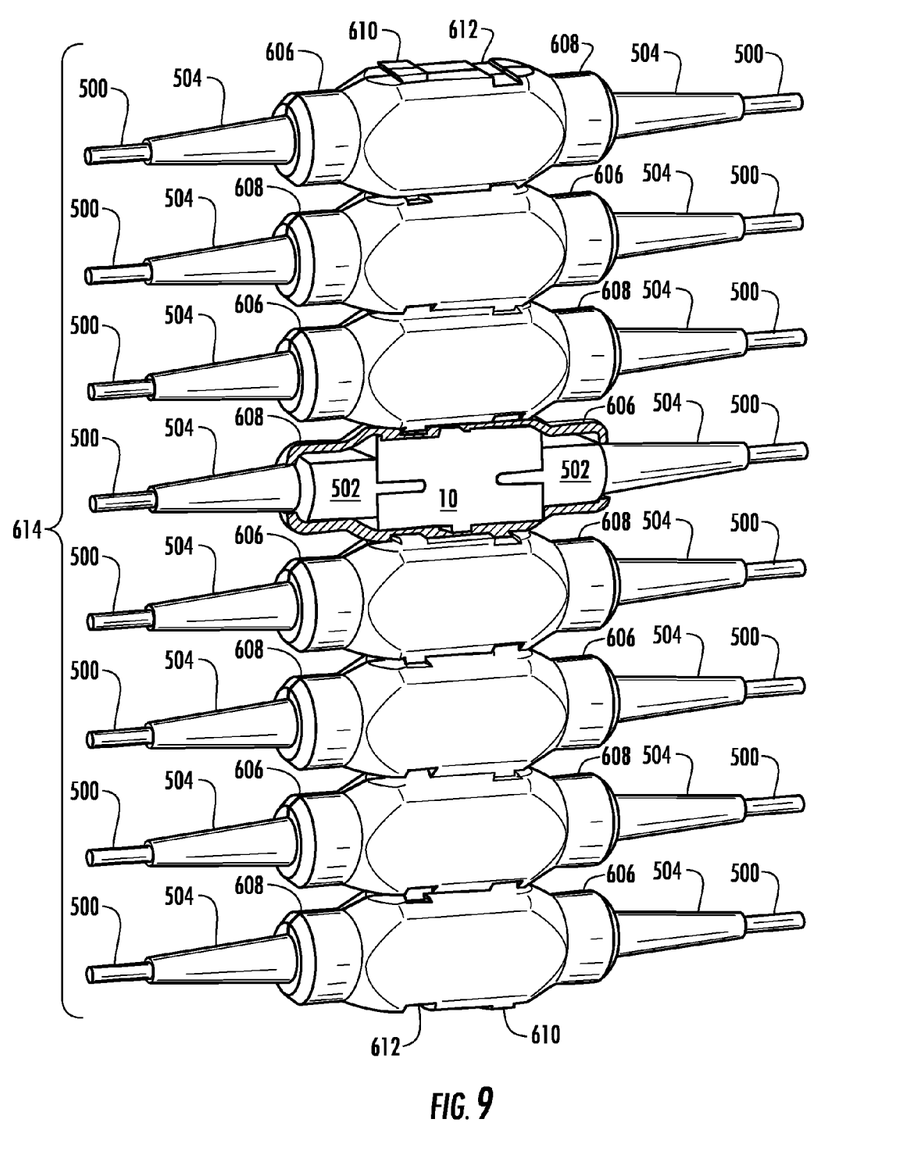
FIG. 9 is a schematic diagram of a perspective view of an array of fiber optic mounts of FIG. 7.

FIGS. 7, 8 and 9 illustrate embodiments of an adapter mount 600. In FIG. 7 a single adapter mount 600 is shown having an enclosure 601 defined by a first section 602 and a second section 604. The first section 602 may be movably and/or removably mounted to the second section 604. Either the first section 602 or the second section 604 may act as a base or a cover. The first section 602 and a second section 604. are shown mated such that the enclosure 601 of the adapter mount 600 is in a closed state. Fiber optic cables 500 extend from the enclosure 601 with the connector boot 504 external to the enclosure 601 of the adapter mount 600. The adapter mount 600 has a first end 606 and a second end 608. Connecting feature 609 allows for the adapter mount 600 to be releasably connected to another adapter mount 600. In FIG. 7, the connecting feature is shown as protrusions 610 located on opposite sides of the adapter mount 600 at the first end 606, and grooves 612. are located on either side of the adapter mount 600 the second end 608. The protrusion 610 and the groove 612 are sized to be complementary. In this manner, a protrusion 610 on one adapter mount 600 fits into the groove 612 of another adapter mount 600.

In this regard, FIG. 8 illustrates two adapter mounts 600(1) and 600(2). In FIG. 8, the first end 606 of adapter mount 600(1) is shown aligned with the second end 608 of the adapter mount 600(2). Accordingly, then, the second end 608 of adapter mount 600(1) is shown aligned with the first end 606 of the adapter mount 600(2). In this manner, the protrusion 610 of the adapter mount 600(1) positions near and may be inserted into the groove 612 of the adapter mount 600(2). Additionally, the protrusion 610 of the adapter mount 600(2) positions near and may be inserted into the groove 612 of the adapter mount 600(1). This allows multiple adapter mounts 600 to be releasably connected together.

FIG. 9 shows a plurality of adapter mounts 600 releasably connected together in an array 614. The protrusions 610 of one adapter mount 600 are positioned into the grooves 612 of the adjacent adapter mount 600 in the array 614. In this manner, adapter mounts 600 may be added to or removed from the array 614. Additionally, the array 614 may be mounted or positioned as desired to provide access to the adapter mounts 600. Further, as shown in FIG. 9, one of the adapter mounts 600 in the array 614 is shown with one of the first section 602 or the second section 604 removed to be able to view the interior of the enclosure 601. Additionally or alternatively, the first section 602 and the second section 604 may connect as a base and a cover. In such a case, the first section 602 or the second section 604 may open to provide access to the interior of the enclosure 601 without disconnecting the fiber optic adapter mount 600 from the array 614. An adapter 10 is shown mounted in the adapter mount 600 with connectors 502 of the fiber optic cables 500 connected to either end of the adapter 10.

Many modifications and other embodiments set forth herein will come to mind to one skilled in the art to which the embodiments pertain having the benefit of the teachings presented in the foregoing descriptions and the associated drawings. Therefore, it is to be understood that the description and claims are not to be limited to the specific embodiments disclosed and that modifications and other embodiments are intended to be included within the scope of the appended claims. It is intended that the embodiments cover the modifications and variations of the embodiments provided they come within the scope of the appended claims and their equivalents. Although specific terms are employed herein, they are used in a generic and descriptive sense only and not for purposes of limitation.

What is claimed is:

1. A fiber optic adapter mount, comprising:
an enclosure comprising a base and a cover;
a receiving area located in the enclosure for directly receiving a fiber optic adapter;
one or more resilient walls, wherein the one or more resilient walls flex to allow the fiber optic adapter to be received in the receiving area;
a retention feature, wherein the retention feature is configured to releasably retain the fiber optic adapter in the receiving area; and
a mounting feature for mounting the fiber optic adapter mount to a surface, wherein the enclosure further comprises a connecting feature allowing the fiber optic adapter mount to be connected to another fiber optic adapter mount.

2. The fiber optic adapter mount of claim 1, wherein the one or more resilient walls flex to allow the fiber optic adapter to be removed from the receiving area.

3. The fiber optic adapter mount of claim 1, wherein the retention feature comprises at least one tab.

4. The fiber optic adapter mount of claim 3 wherein the at least one tab extends from one of the one or more resilient walls.

5. The fiber optic adapter mount of claim 1, wherein the cover is attached to the base.

6. The fiber optic adapter mount of claim 5, wherein the cover is hingedly attached to the base allowing the cover to mate with the base and provide an open position and a closed position.

7. The fiber optic adapter mount of claim 6, wherein the cover provides a partially open position.

8. The fiber optic adapter mount of claim 7, wherein access is provided to an interior of the enclosure when the cover is in the open position.

9. The fiber optic adapter mount of claim 1, wherein the connecting feature comprises a protrusion.

10. The fiber optic adapter mount of claim 1, wherein the connecting feature comprises a groove.

11. The fiber optic adapter of claim 1, wherein the connecting feature comprises at least one protrusion and at least one complementary groove such that the at least one protrusion of the fiber optic adapter mount inserts into a groove of the another fiber optic adapter mount to releasably connect the fiber optic adapter mount to the another fiber optic adapter mount.

12. A fiber optic adapter mount, comprising:
an enclosure having an interior, wherein the enclosure comprises a base and a cover, and wherein the cover is hingedly movable with the base from an open position to a closed position;
a receiving area in the interior of the enclosure for directly receiving a fiber optic adapter, the receiving area comprising resilient walls;
a retention feature extending from the resilient walls, wherein the retention feature is configured to releasably retain the fiber optic adapter in the receiving area;
a mounting feature for mounting the adapter mount to a surface; and
an actuator extending from one of the resilient walls, and wherein pressure applied to the actuator forces the resilient wall away from another resilient wall allowing the fiber optic adapter to be removed from the receiving area.

13. The fiber optic adapter mount of claim 12, further comprising one or more tie down lance formed in the base, wherein the tie down lance is configured to receive a restraining device for restraining fiber optic cable.

14. An array of fiber optic adapter mounts, comprising:
a plurality of fiber optic adapters mounts, wherein each fiber optic adapter mount in the array comprises:
an enclosure having an interior, a first section and a second section;
a receiving area for directly receiving a fiber optic adapter in the interior; and
a connecting feature, wherein the connecting feature allows the fiber optic adapter mounts to be directly and releasably connected to each other,
wherein one of the first section and the second section of at least one of the fiber optic adapter mounts is removable to allow access to an interior of the enclosure of the fiber optic adapter mount without disconnecting the fiber optic adapter mount from the array.

15. The fiber optic adapter mount of claim 1, wherein the fiber optic adapter mount is integral to and formed as part of a body of the fiber optic adapter.

16. A fiber optic adapter mount, comprising:
an enclosure comprising a base and a cover;
a receiving area located in the enclosure for directly receiving a fiber optic adapter;
one or more resilient walls, wherein the one or more resilient walls flex to allow the fiber optic adapter to be received in the receiving area;
a retention feature, wherein the retention feature is configured to releasably retain the fiber optic adapter in the receiving area; and
a mounting feature for mounting the fiber optic adapter mount to a surface,
wherein the fiber optic adapter mount is integral to and formed as part of a body of the fiber optic adapter.

* * * * *